US012572049B2

(12) United States Patent
Bayn et al.

(10) Patent No.: US 12,572,049 B2
(45) Date of Patent: Mar. 10, 2026

(54) SILICON PHOTONICS PHASE MODULATORS AND THEIR APPLICATIONS

(71) Applicant: Quantum Transistors Technology Ltd., Herzliya (IL)

(72) Inventors: Igal Bayn, New York, NY (US); Moshe Tordjman, Haifa (IL)

(73) Assignee: Quantum Transistors Technology Ltd., Binyamina (IL)

( * ) Notice: Subject to any disclaimer, the term of this patent is extended or adjusted under 35 U.S.C. 154(b) by 270 days.

(21) Appl. No.: 18/324,978

(22) Filed: May 28, 2023

(65) Prior Publication Data

US 2024/0393654 A1    Nov. 28, 2024

(51) Int. Cl.
        *G02F 1/225*          (2006.01)
        *G02F 1/21*            (2006.01)
(52) U.S. Cl.
        CPC .............. *G02F 1/225* (2013.01); *G02F 1/212* (2021.01)
(58) Field of Classification Search
        CPC .................................. G02F 1/225; G02F 1/221
        See application file for complete search history.

(56) References Cited

U.S. PATENT DOCUMENTS

| | | | | |
|---|---|---|---|---|
| 7,016,555 B2 * | 3/2006 | Ridgway | ............... | G02F 1/2255 |
| | | | | 385/145 |
| 11,226,507 B2 * | 1/2022 | Liang | ........................ | G02F 1/05 |

| | | | | |
|---|---|---|---|---|
| 12,164,184 B2 * | 12/2024 | Liang | ..................... | G02B 6/131 |
| 2004/0184694 A1 * | 9/2004 | Ridgway | ................ | G02F 1/065 |
| | | | | 385/3 |
| 2016/0313579 A1 * | 10/2016 | Yokoyama | ............. | G02B 6/125 |
| 2021/0124233 A1 * | 4/2021 | Liang | ........................ | G02F 1/05 |
| 2022/0244583 A1 * | 8/2022 | Liang | ..................... | G02F 1/035 |

FOREIGN PATENT DOCUMENTS

| | | | | |
|---|---|---|---|---|
| WO | WO-2023035606 A1 * | 3/2023 | ............. | G02F 1/025 |

OTHER PUBLICATIONS

English language translation of WO-2023035606-A1 (Year: 2023).*
Ortmann et al., Ultra-Low-Power Tuning in Hybrid Barium Titanate-Silicon Nitride Electro-optic Devices on Silicon, ACS Photonics 2019 6 (11), 2677-2684, DOI: 10.1021/acsphotonics.9b00558 (Year: 2019).*
Nguyen, V.H.; Kim, I.K.; Seok, T.J. Low-Loss and Broadband Silicon Photonic 3-dB Power Splitter with Enhanced Coupling of Shallow-Etched Rib Waveguides. Appl. Sci. 2020, 10, 4507. https://doi.org/10.3390/app10134507 (Year: 2020).*

(Continued)

*Primary Examiner* — Peter Radkowski
(74) *Attorney, Agent, or Firm* — Meitar Patents Ltd.; Daniel Kligler

(57)    ABSTRACT

An optoelectronic device includes a substrate, an optical waveguide disposed on the substrate, a dielectric layer disposed over the optical waveguide on the substrate, and a membrane comprising an electro-optical material disposed over the dielectric layer and overlying at least a part of the optical waveguide. Electrodes are configured to apply an electric field to the electro-optical material in a vicinity of the optical waveguide, thereby modulating a phase of a guided optical wave propagating in the waveguide.

29 Claims, 4 Drawing Sheets

(56)  References Cited

OTHER PUBLICATIONS

Karvounis et al., Barium Titanate Nanostructures and Thin Films for Photonics, Advanced Optical Materials 8(24), 2020 https://doi.org/10.1002/adom.202001249, https://doi.org/10.3929/ethz-b-000451850 (Year: 2020).*

Duncan et al., Dynamic Waveguiding in Silicon-Integrated Barium Titanate Thin Films, 2019 IEEE MTT-S International Conference on Numerical Electromagnetic and Multiphysics Modeling and Optimization (NEMO), Boston, MA, USA, 2019, pp. 1-4, doi: 10.1109/NEMO.2019.8853782. (Year: 2019).*

International Application # PCT/IB2024/053137 Search Report dated Nov. 21, 2024.

Chrostowski et al., "Silicon Photonics Design," Cambridge University Press, pp. 1-438, year 2019.

Wilmart et al., "A Versatile Silicon-Silicon Nitride Photonics Platform for Enhanced Functionalities and Applications," Applied Sciences, vol. 9, pp. 1-16, Jan. 11, 2019.

Czornomaz et al., "BTO-enhanced Silicon Photonics—a Scalable PIC Platform with Ultra-efficient Electro-optical Modulation," Optica Publishing Group, pp. 1-3, year 2022.

Doerr, "Silicon Photonic Integration in Telecommunications," Frontiers in Physics, vol. 3, article 37, pp. 1-16, Aug. 5, 2015.

Eltes et al., "A BaTiO3-based Electro-optic Pockels Modulator Monolithically Integrated on an Advanced Silicon Photonics Platform," Journal of Lightwave Technology, vol. 37, No. 5, pp. 1456-1462, Mar. 1, 2019.

Eltes et al., "An Integrated Optical Modulator Operating at Cryogenic Temperatures," Nature Materials, vol. 19, pp. 1164-1168, Nov. 2020.

Ortmann et al., "Ultra-Low-Power Tuning in Hybrid Barium Titanate-Silicon Nitride Electro-optic Devices on Silicon," ACS Photonics, vol. 6, pp. 2677-2684, year 2019.

Roeloffzen et al., "Low-Loss Si3N4 TriPlex Optical Waveguides: Technology and Applications Overview," IEEE Journal of Selected Topics in Quantum Electronics, vol. 24, No. 4, pp. 1-21, July/Aug. 2018.

Liu et al., "Thermo-optic Phase Shifters Based on Silicon-on-insulator Platform: State-of-the-art and a Review," Frontiers of Optoelectronics, vol. 15, No. 9, Springer, pp. 1-21, Apr. 12, 2022.

* cited by examiner

SILICON PHOTONICS PHASE MODULATORS AND THEIR APPLICATIONS

FIELD OF THE INVENTION

The present invention relates generally to opto-electronic systems, and particularly to opto-electronic phase modulators and their applications.

BACKGROUND

Silicon photonics systems use silicon and its compounds as an optical medium. The optical medium is patterned with sub-micron precision into optical waveguides and other microphotonic components, such as amplitude and phase modulators of optical radiation propagating in the waveguides.

SUMMARY

Embodiments of the present invention that are described hereinbelow provide improved designs and fabrication methods for and applications of silicon photonics light modulators.

There is therefore provided, in accordance with an embodiment of the invention, an optoelectronic device, including a substrate, an optical waveguide disposed on the substrate, a dielectric layer disposed over the optical waveguide on the substrate, and a membrane including an electro-optical material disposed over the dielectric layer and overlying at least a part of the optical waveguide. The device further includes electrodes configured to apply an electric field to the electro-optical material in a vicinity of the optical waveguide, thereby modulating a phase of a guided optical wave propagating in the waveguide.

In a disclosed embodiment, a controller is coupled to apply a voltage between the electrodes so as to generate the electric field.

In another embodiment, the optical waveguide includes an optical material having a first intrinsic refractive index, while the electro-optical material has a second intrinsic refractive index that is greater than the first refractive index. Furthermore, the waveguide has a first effective refractive index, and the membrane has a second effective refractive index, and the optical waveguide, the dielectric layer, and the membrane have dimensions chosen so that the first effective refractive index is greater than the second effective refractive index at a wavelength of the guided optical wave. Additional or alternatively, the guided optical wave has a wavelength in a visible range of the spectrum.

In a further embodiment, the electro-optical material includes barium titanate (BTO). Additionally or alternatively, the waveguide includes silicon nitride (SiN), and the dielectric material includes silicon dioxide ($SiO_2$). Further additionally or alternatively, the substrate is selected from a set of substrate materials consisting of silicon and fused silica.

In one embodiment, the dielectric layer has a thickness between 50 nm and 500 nm.

In a disclosed embodiment, the membrane overlies a first part of the optical waveguide but does not overlie a second part of the optical waveguide, and the optical waveguide includes a coupler comprising a pair of opposing tapers, which meet at a boundary of the membrane between the first and second parts.

There is further provided, in accordance with an embodiment of the invention, an optoelectronic device, including a substrate and a Mach-Zehnder interferometer disposed on the substrate. The Mach-Zehnder interferometer includes first and second optical waveguides, a splitter coupled to receive an input guided optical wave and split the guided optical wave into respective first and second guided optical waves propagating into the first and second optical waveguides, and a combiner coupled to receive the first and second guided optical waves exiting from the first and second optical waveguides so that the first and second guided optical waves interfere to form an output guided optical wave. The device further includes a dielectric layer disposed over the first and second optical waveguides on the substrate, a membrane including an electro-optical material disposed over the dielectric layer and overlying at least one of the first and second optical waveguides, and electrodes configured to apply an electric field to the electro-optical material in a vicinity of the at least one of the first and second optical waveguides, thereby modulating an intensity of the output guided optical wave by altering a phase difference between the first and second guided optical waves.

In a further embodiment, the membrane overlies both of the first and second optical waveguides. Additionally or alternatively, the electrodes include a first pair of the electrodes in proximity to the first optical waveguide and a second pair of the electrodes in proximity to the second optical waveguide.

There is still further provided, in accordance with an embodiment of the invention, an optoelectronic apparatus, including a substrate, and a network of interconnected Mach-Zehnder interferometers disposed on the substrate. Each Mach-Zehnder interferometer includes first and second optical waveguides, a splitter coupled to receive an input guided optical wave and split the guided optical wave into respective first and second guided optical waves propagating into the first and second optical waveguides, and a combiner coupled to receive the first and second guided optical waves exiting from the first and second optical waveguides so that the first and second guided optical waves interfere to form an output guided optical wave. The device further includes a dielectric layer disposed over the multiple interconnected Mach-Zehnder interferometers on the substrate, a membrane including a contiguous layer of an electro-optical material disposed over the dielectric layer and overlying at least a part of the network of interconnected Mach-Zehnder interferometers, electrodes configured to apply an electric field to the electro-optical material in a vicinity of at least one of the first and second optical waveguides in each of at least some of the Mach-Zehnder interferometers, and a controller coupled to apply voltages between the electrodes so as to switch guided optical waves through the network.

In a disclosed embodiment, the membrane overlies a first part of the network but does not overlie a second part of the network, and at least one of the optical waveguides includes a coupler comprising a pair of opposing tapers, which meet at a boundary of the membrane, between the first and second parts. Additionally or alternatively, at least some of the Mach-Zehnder interferometers are contained entirely below the membrane and do not include the opposing tapers.

The present invention will be more fully understood from the following detailed description of the embodiments thereof, taken together with the drawings in which:

DETAILED DESCRIPTION OF EMBODIMENTS

Introduction

Figure 1:
FIG. 1 is a schematic sectional view of an electro-optical device, in accordance with an embodiment of the invention.

Silicon photonic systems utilize waveguide-based interferometers, such as Mach-Zehnder interferometers, as optical modulation and switching circuits. A phase modulator is commonly used to modulate the phase of the guided wave in at least one of the arms of the interferometer. The modulation of the relative optical phase between the two arms of the interferometer causes the guided waves to interfere, after passing the two arms, either constructively or destructively, thus modulating the output power of the interferometer. For this purpose, silicon photonic phase modulators may be implemented using various techniques, such as thermal phase shifters, p-i-n diodes, stress-optic actuators, or Pockels modulators (Pockels cells). (The term "silicon photonic phase modulators" is used in the present description to denote modulators of optical phase that are compatible with silicon photonic systems and fabrication processes, though the components of the phase modulators may comprise materials other than silicon.)

There is considerable interest in integrating silicon photonic phase modulators into optical logic networks for applications such as quantum computing, using existing silicon photonics fabrication processes. This sort of integration can be challenging in quantum computing systems that use visible light, such as systems based on diamond color centers. Such a network typically has the following requirements for the modulator:

transparency in visible wavelengths;

integration with a low-loss, low-luminescence silicon nitride (SiN) waveguide;

ultra-low power dissipation for cryogenic operation;

operation both as a high-speed modulator with bandwidth in the gigahertz range and a low-speed phase shifter with rates in the megahertz range; and losses independent of phase.

Additionally, it is desirable that the network be compatible with common semiconductor manufacturing processes, such as complementary metal-oxide-semiconductor (CMOS) processes, with integrated photodetection capability and amenability to complex routing.

In order to satisfy the requirements described hereinabove, embodiments of the present invention that are described herein use Pockels modulators based on barium titanate ($BaTiO_3$, also abbreviated as BTO). BTO-based silicon photonic phase modulators conventionally operate at near-infrared (NIR) wavelengths, where both BTO and Si are transparent. At visible wavelengths, BTO is still transparent, but Si absorbs the optical radiation and cannot be used in this spectral range. Furthermore, simply copying a NIR single-mode BTO waveguide structure into the visible range would cause the BTO structure to function as a multi-mode waveguide.

To overcome this limitation, embodiments of the present invention that are described herein use a BTO membrane overlying a SiN waveguide, forming a cladding for the waveguide. The BTO membrane is separated from the SiN waveguide by a sub-wavelength gap, containing a dielectric material such as $SiO_2$. A controller is coupled to the BTO membrane via conductive electrodes. A guided wave, with wavelength in the visible part of the spectrum, propagates in the SiN waveguide, with only an evanescent part of the propagating mode overlapping the BTO membrane. The BTO membrane modifies the effective refractive index of the propagating guided wave as a function of the voltage applied between the electrodes. Changes in the voltage change the phase of the propagating mode, thus applying a low-loss phase modulation to a visible-wavelength guided wave. Although the inventors have found BTO to be advantageous for the present purposes, in alternative embodiments other electro-optical materials may be used to form the membrane of the optical phase modulator.

In an embodiment, a guided wave Mach-Zehnder interferometer, based on SiN waveguides, has a BTO membrane overlying one or both of its arms. By applying an electrical field across the BTO membrane adjacent to one of the arms of the interferometer, the phase of the guided wave propagating in that arm is modulated, and thus the output of the interferometer is modulated due to the interference between the guided waves from the two arms.

In an another embodiment, multiple guided wave Mach-Zehnder interferometers are interconnected into a network. The entire network is overlaid with a BTO membrane. By applying an electrical field across the BTO membrane adjacent to selected arms of the interferometers, the) outputs of these interferometers may be modulated, thus switching the logical configuration of the network.

The disclosed embodiments provide optoelectronic apparatus comprising a phase modulator, which comprises an optical waveguide and an overlying layer of electro-optical material. A controller is coupled to electrodes on the layer of electro-optical material and applies an electrical field between the electrodes so as to modulate the optical phase of a guided wave of optical radiation propagating in the optical waveguide.

Additional embodiments provide a Mach-Zehnder interferometer comprising two arms, each comprising an optical waveguide. At least one of the two arms is overlaid by a layer of electro-optical material. A controller is coupled to electrodes on the layer of electro-optical material and modulates the optical power exiting from the interferometer by applying an electrical field between the electrodes so as to modulate the optical phase of a guided wave of optical radiation propagating in the arm.

Further embodiments provide a guided-wave network of interferometers, comprising multiple interconnected guided-wave Mach-Zehnder interferometers and a contiguous layer of electro-optical material overlying the interferometers. A controller is coupled to electrodes on electro-optical material. The controller modulates the optical power exiting from selected interferometers by applying electric fields between selected electrodes adjacent to the arms of the selected interferometers.

Phase Modulator

FIG. 1 is a schematic sectional view of an optoelectronic device 100, in accordance with an embodiment of the invention. Device 100 comprises a silicon photonic phase modulator 102 and a controller 104. Phase modulator 102 comprises silicon dioxide ($SiO_2$) layers 106 deposited on a substrate 107, such as a silicon-on-insulator (SOI) substrate. In an alternative embodiment, substrate 107 may comprise $SiO_2$ or silicon with an $SiO_2$ layer grown on it. A single-mode SiN-waveguide 108, having a width $W_{WG}$ and a thickness $Th_{WG}$, is deposited over one of $SiO_2$ layers 106 and is then overlaid by a further thin layer of $SiO_2$. With reference to Cartesian coordinates 110, guided optical radiation propagates in waveguide 108 in the z-direction.

A thin sheet of BTO, referred to as a BTO membrane 112, is deposited over a thin portion of $SiO_2$ layer 106 overlying waveguide 108, parallel to and sufficiently close to waveguide 108 so that an evanescent part of the single mode guided wave (also referred to as the "tail" of the mode) propagating in the waveguide overlaps the membrane. Thus, BTO membrane 112 acts as a cladding for waveguide 108. The dimensions of BTO membrane 112 in the x- and y-directions are labelled as width $W_{BTO}$ and thickness $Th_{BTO}$, respectively. The gap formed by the $SiO_2$ layer between BTO membrane 112 and waveguide 108 is labelled $G_{BTO/WG}$. Conductive electrodes 114 and 116 couple BTO membrane 112 to controller 104, with the gap between the electrodes labelled as $G_{COND}$. Example numerical values for the above dimensions will be given hereinbelow. In the z-direction, the length of phase modulator 102 is chosen to achieve the desired range of phase variation, as a function of the voltage applied between electrodes 114 and 116, in the guided wave propagating through waveguide 108.

Controller 104 typically comprises a programmable processor, which is programmed in software and/or firmware to drive phase modulator 102 by imposing a voltage across the membrane via electrodes 114 and 116. Alternatively or additionally, controller 104 comprises hard-wired and/or programmable hardware logic circuits, which drive phase modulator 102. Although controller 104 is shown in the figures, for the sake of simplicity, as a single, monolithic functional block, in practice the controller may comprise a single chip or a set of two or more chips, with suitable interfaces for outputting the drive signals. Additionally or alternatively, controller 104 may be fabricated as an integrated circuit on substrate 107.

When controller 104 imposes a voltage across BTO membrane 112, the refractive index of the membrane changes in response to the electrical field generated in the membrane due to the electro-optical effect. This change in the local refractive index of BTO membrane 112 changes the effective refractive index $n_{eff}$ of the guided mode propagating in waveguide 108. The change of $n_{eff}$ changes the phase of the guided mode, and is thus responsible for the phase modulating functionality of device 100.

The present embodiment has several advantages over modulators of other types:

a. Due to the small overlap between BTO membrane 112 and the mode propagating in waveguide 108, thickness variations of the membrane and waveguide have only a minor impact on propagation losses.

b. As BTO membrane 112 does not guide the propagating mode, there is no need to etch the membrane to accommodate the mode, thus avoiding the potential negative impact of sidewall roughness associated with the etching process.

c. As the guided mode propagates only in waveguide 108, there are no transitions of the guided mode between the SiN waveguide and an electro-optic medium (such as BTO), thus avoiding power losses associated with such transitions;

d. The alignment between BTO membrane 112 and waveguide 108 in the xy-plane may be relaxed to hundreds of nanometers, rather than requiring alignment to within tens of nanometers when coupling the guided wave between a waveguide and a conventional modulator. To avoid overlap between waveguide 108 and electrodes 114 and 116, however, it is desirable that the distance between a sidewall of waveguide 108 and the closest edge of either of electrodes 114 or 116 be at least 2 µm.

e. The SiN-material of waveguide 108 may be deposited using a high-temperature process, such as low-pressure chemical vapor deposition (LPCVD), which is beneficial in reducing optical losses.

Processing constraints and considerations of the guided mode require BTO membrane 112 to have a minimal width $W_{BTO}$ around 10 µm, which is substantially greater than the waveguide width $W_{WG}$. Such a wide BTO membrane will potentially have many guided wave modes (cladding modes) both in the x- and y-directions. Furthermore, the fact that BTO has a higher intrinsic refractive index (n=2.4025) than that of SiN (n=2.0), makes the BTO mode volume even larger. In order to minimize coupling between the guided modes of BTO membrane 112 and waveguide 108, phase modulator 102 is configured so that the effective index of the fundamental mode of the waveguide, $n_{eff0,WG}$, exceeds that of the fundamental mode of the membrane, $n_{eff0,BTO}$, as will be further elaborated hereinbelow.

Figures 2, 3:
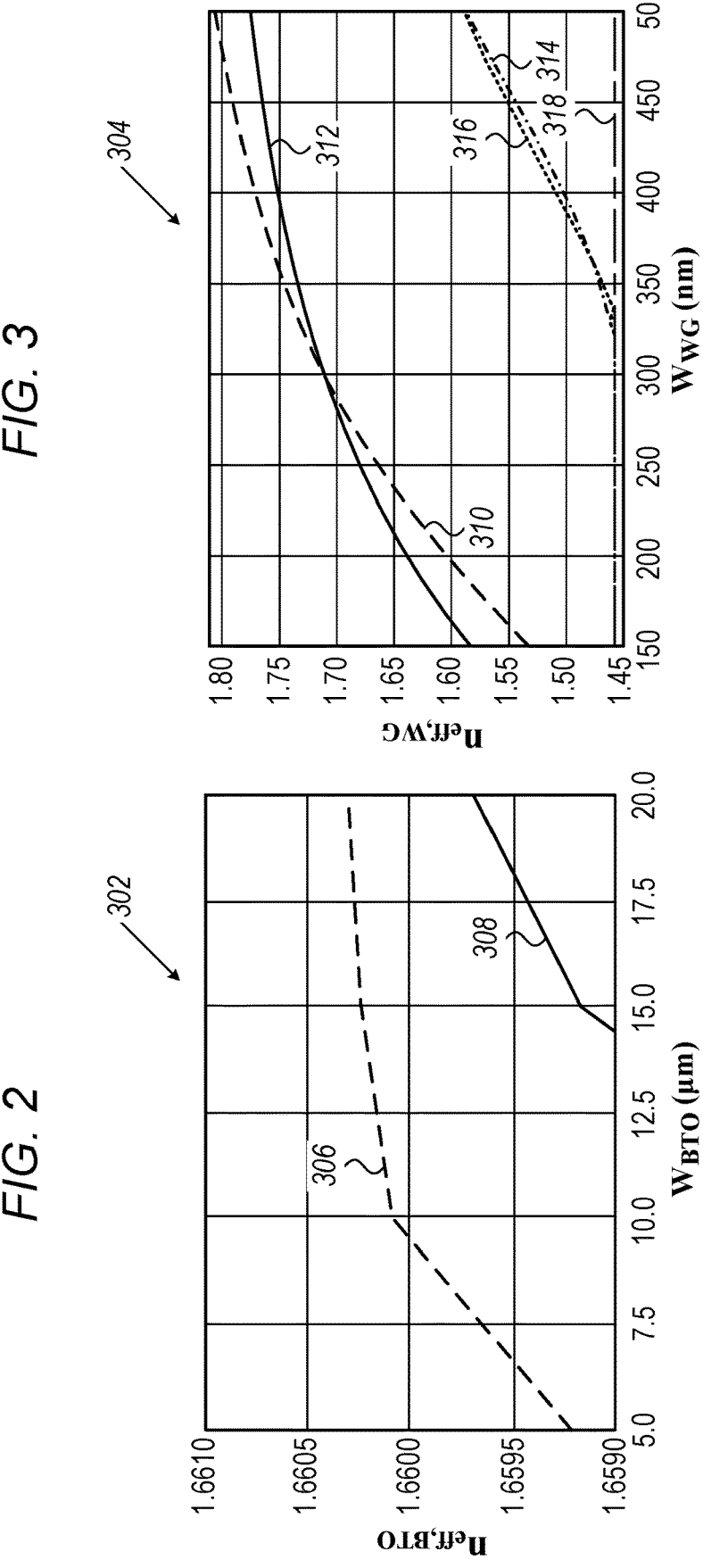
FIGS. 2 and 3 are plots that show the effective index of guided waves as a function of the width of an electro-optical membrane and a waveguide in the device of FIG. 1, in accordance with an embodiment of the invention.

FIGS. 2 and 3 show plots 302 and 304 that illustrate the effective index of cladding modes (plot 302) and guided wave modes (plot 304) as a function of the width of BTO membrane 112 and waveguide 108, respectively, in accordance with embodiments of the invention. The effective indices were calculated at a wavelength of 637 nm.

In plot 302, curves 306 and 308 respectively illustrate the effective indices of the lowest cladding modes 0 (TE) and 1 (TM) as a function of the width $W_{BTO}$ of BTO membrane 112 for a membrane thickness $Th_{BTO}$ of 50 nm. The effective index $n_{eff0,BTO}$ for the fundamental cladding mode of BTO membrane 112 is the more relevant for preventing coupling between the membrane and waveguide 108. The values of $n_{eff0,BTO}$ increase from 1.659 at $W_{BTO}$=5 µm to 1.660 for $W_{BTO}$=20 µm.

In plot 304, curves 310, 312, 314, and 316 respectively illustrate the effective indices of waveguide modes 0 (TE), 1 (TM), 2 (TE), and 3 (TM) as a function of the width $W_{WG}$ of waveguide 108 for a waveguide thickness $Th_{WG}$ of 300 nm, which is substantially greater than $Th_{BTO}$. The effective index $n_{eff0,WG}$ for the fundamental TE mode (mode 0) of waveguide 108 is the most relevant for preventing coupling between the waveguide and membrane 112. The values of $n_{eff0,WG}$ for the fundamental TE mode increase from 1.53 at $W_{WG}$=150 nm to 1.73 for $W_{WG}$=330 nm. (In practice, to accommodate a 20 nm safety margin in the lithographic process, a nominal width of 310 nm is used, yielding a nominal $n_{eff0,WG}$ of 1.717.) For reference, the refractive index of $SiO_2$ is shown by a curve 318.

Both parameters $W_{WG}$ and $Th_{WG}$ are important for the design of waveguide 108:

The width $W_{WG}$ should be maximized in order to reduce scattering losses from the etched sidewalls.

The thickness $Th_{WG}$ should be maximized to reduce sensitivity to thickness variations related to the growth of the SiN layer.

These two conditions are not independent, as for a single-mode waveguide, an increase in the waveguide width $W_{WG}$ decreases the maximum permitted thickness ThWG, and vice versa.

For waveguide 108 with a nominal width $W_{WG}$ of 310 nm and a thickness $Th_{WG}$ of 300 nm, the above-mentioned requirement for $n_{eff0,WG} > n_{eff0,BTO}$ is well satisfied, thus minimizing the coupling between waveguide 108 and BTO membrane 112.

In one embodiment, the gap $G_{BTO/WG}$ between waveguide 108 and BTO membrane 112 is 150 nm. Alternatively, the gap may have a different width, for example between 50 nm and 500 nm. For $G_{BTO/WG}$=150 nm with a driving voltage of 20 V imposed by controller 104 and with an electrode gap $G_{COND}$ of 6 μm, a length of phase modulator 102 in the z-direction of 102 μm is sufficient for a phase change of 180 degrees for the guided wave. (A 180-degree phase change results in destructive interference at the exit from the interferometer, i.e., zero exit power.) If phase modulator 102 is used in both arms of a Mach-Zehnder interferometer, the length of each modulator may be halved to 61 μm. The coupling loss for each end of phase modulator 102 is calculated to be 0.926%. The above-mentioned gap $G_{COND}$ of 6 μm was chosen as its effect on the mode losses is only $2.914*10^{-10}$ dB.

Waveguide Transitions

Figure 4:
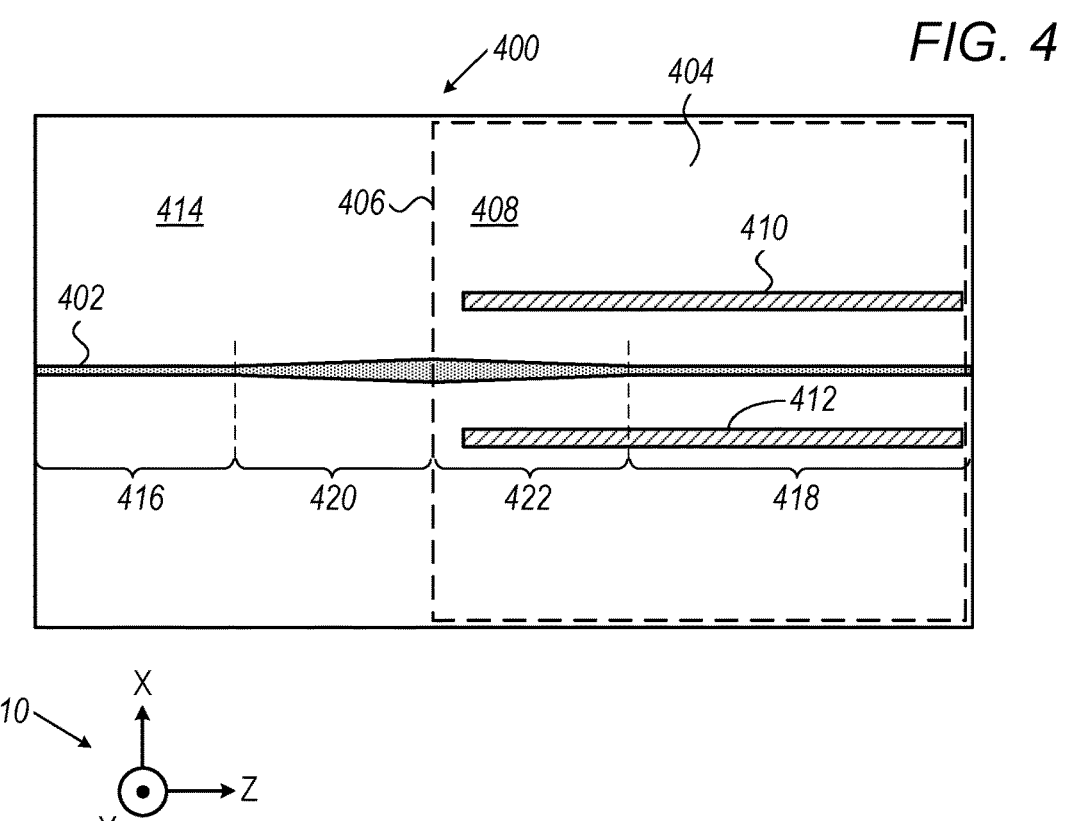
FIG. 4 is a schematic top view illustrating a transition of a waveguide into a phase modulator, in accordance with an embodiment of the invention.

FIG. 4 is a schematic top view 400 illustrating a transition of a waveguide 402 into a phase modulator 404, in accordance with an embodiment of the invention.

Waveguide 402 is similar to waveguide 108 in FIG. 1. Phase modulator 404, shown in part within a dotted-line frame 406, is similar to phase modulator 102 in FIG. 1. The orientation of phase modulator 404 is indicated by appropriately rotated Cartesian coordinates 110. Phase modulator 404 comprises, similarly to phase modulator 102, a BTO membrane 408 and electrodes 410 and 412. SiN waveguide 402 is embedded in an $SiO_2$-layer 414.

In a section 416 of waveguide 402, well outside phase modulator 404, and in a section 418 of the waveguide that is well inside the phase modulator, waveguide 402 is a single-mode SiN waveguide. In the present embodiment, these sections of waveguide 402 have a width $W_{WG}$ of 310 nm and a thickness $Th_{WG}$ of 330 nm, although larger or smaller dimensions may alternatively be used. Were waveguide 402 to be brought into phase modulator 404 without any change in its dimensions, the guided wave propagating within the waveguide would suffer a sum of in-coupling and out-coupling losses of −0.67 dB at the entry into and exit from the phase modulator.

In order to reduce this coupling loss, the cross-sectional dimensions of waveguide 402 are modified to form a coupler comprising a pair of opposing tapers in sections 420 and 422, which meet at the boundary of phase modulator 404, as indicated by frame 406: In section 420, the width $W_{WG}$ increases linearly from 310 nm to 1000 nm. In section 422, the taper is reversed, with the width $W_{WG}$ reduced linearly from 1000 nm to 310 nm. Taking the length of each taper, i.e., the length of each section 420 and 422, to be 10 μm, the guided wave transitions adiabatically to the new dimensions, and the total coupling loss is reduced to −0.12 dB at the entry into and exit from phase modulator 404 (as compared to a loss of −0.69 dB for a non-tapered waveguide). Alternatively, waveguide 402 and the tapers in sections 420 and 422 may have other longitudinal and transverse dimensions, depending on application requirements.

Mach-Zehnder Interferometers

Figure 5:
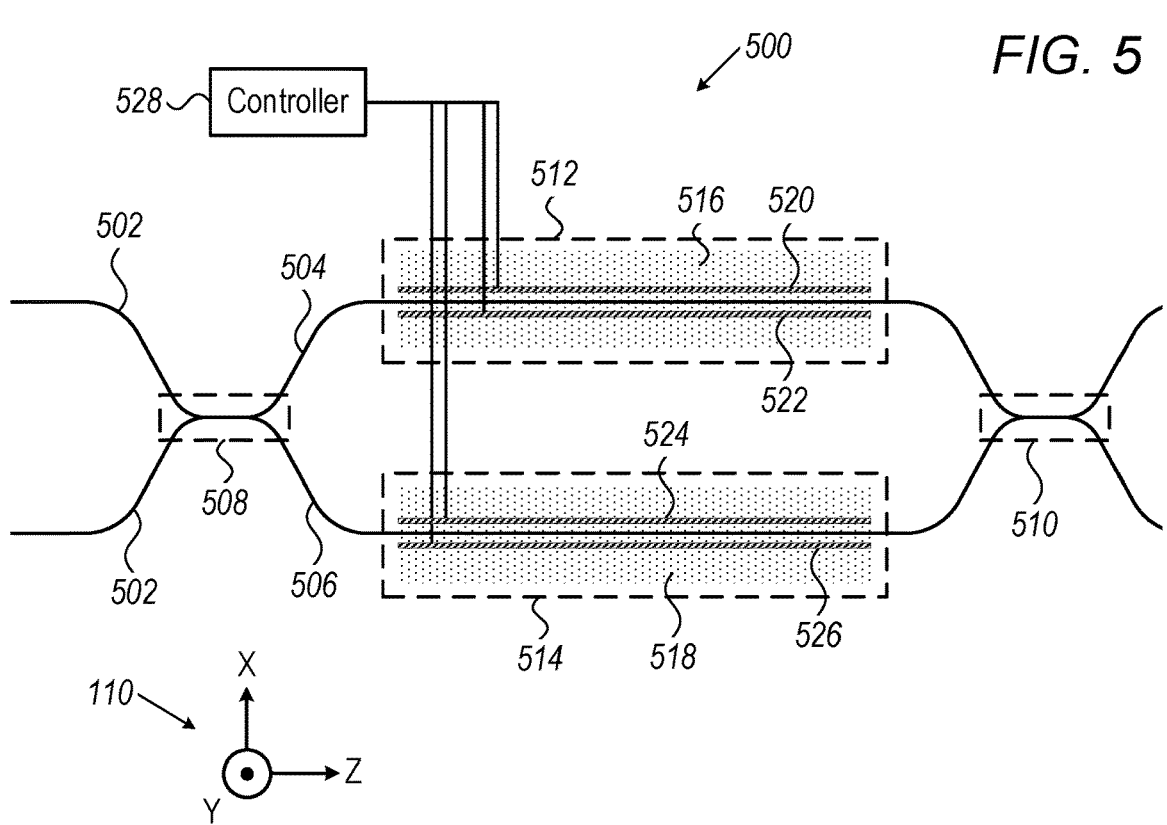
FIG. 5 is a schematic top view of a Mach-Zehnder interferometer, in accordance with an embodiment of the invention.

FIG. 5 is a schematic top view of a Mach-Zehnder interferometer 500, in accordance with an embodiment of the invention.

Interferometer 500 is based on single-mode SiN waveguides 502 within an $SiO_2$ layer, similar to waveguides 102 and 402 (FIGS. 1 and 4, respectively). Interferometer 500 comprises two arms 504 and 506. (The term "arm" is used to denote one of the waveguides that route the guided wave through the interferometer.) Directional waveguide couplers 508 and 510 serve as 50:50 splitters/combiners for the guided waves at the respective entrance to and the exit from interferometer 500. (Directional couplers are used, rather than multimode splitters, in order to prevent parasitic back reflections.) Directional waveguide coupler 508 serves as a splitter to receive and split an input guided optical wave into guided optical waves propagating in arms 504 and 506. Directional waveguide coupler 510 serves as a combiner to receive and combine the first and second guided optical waves exiting from arms 504 and 506 so that the waves interfere to form an output guided optical wave.

Two phase modulators 512 and 514 (similar to phase modulator 102 in FIG. 1), comprising respective BTO membranes 516 and 518 and electrodes 520, 522, 524, and 526, are positioned over arms 504 and 506, respectively. In the present example, the widths $W_{BTO}$ of BTO membranes 516 and 518 are 25 μm and the thicknesses of the membranes are 50 nm. The gap $G_{BTO/WG}$ between arms 504 and 506 and each of BTO membranes 516 and 518 is 150 nm. Alternatively, other dimensions may be used. Furthermore, for some applications, it is sufficient that the BTO membrane overlie only one of the arms.

Arms 504 and 506 enter into and exit from respective phase modulators 512 and 514 via tapered transitions of the kind shown in FIG. 4. A controller 528, similar to controller 104 (FIG. 1), is coupled to electrodes 520-526 for driving phase modulators 512 and 514. By adjusting the voltages applied to the electrodes, controller 528 is able to alter the relative phases of the guided optical waves in arms 504 and 506 and thus switch the intensity of the output from interferometer 500 by means of constructive or destructive interference between the waves.

In the present example, the length of interferometer 500 in the z-direction is 280 μm, and the width in the x-direction is 85 μm. The gap within directional couplers 508 and 510 (i.e., the separation of the two waveguides forming the coupler) is 200 nm, requiring a length of 15 μm for each coupler. In alternative embodiments, Mach-Zehnder interferometers with different dimensions may be used.

Given the above example dimensions, the total insertion loss of interferometer 500 is estimated to be only about 0.16 dB.

Figure 6:
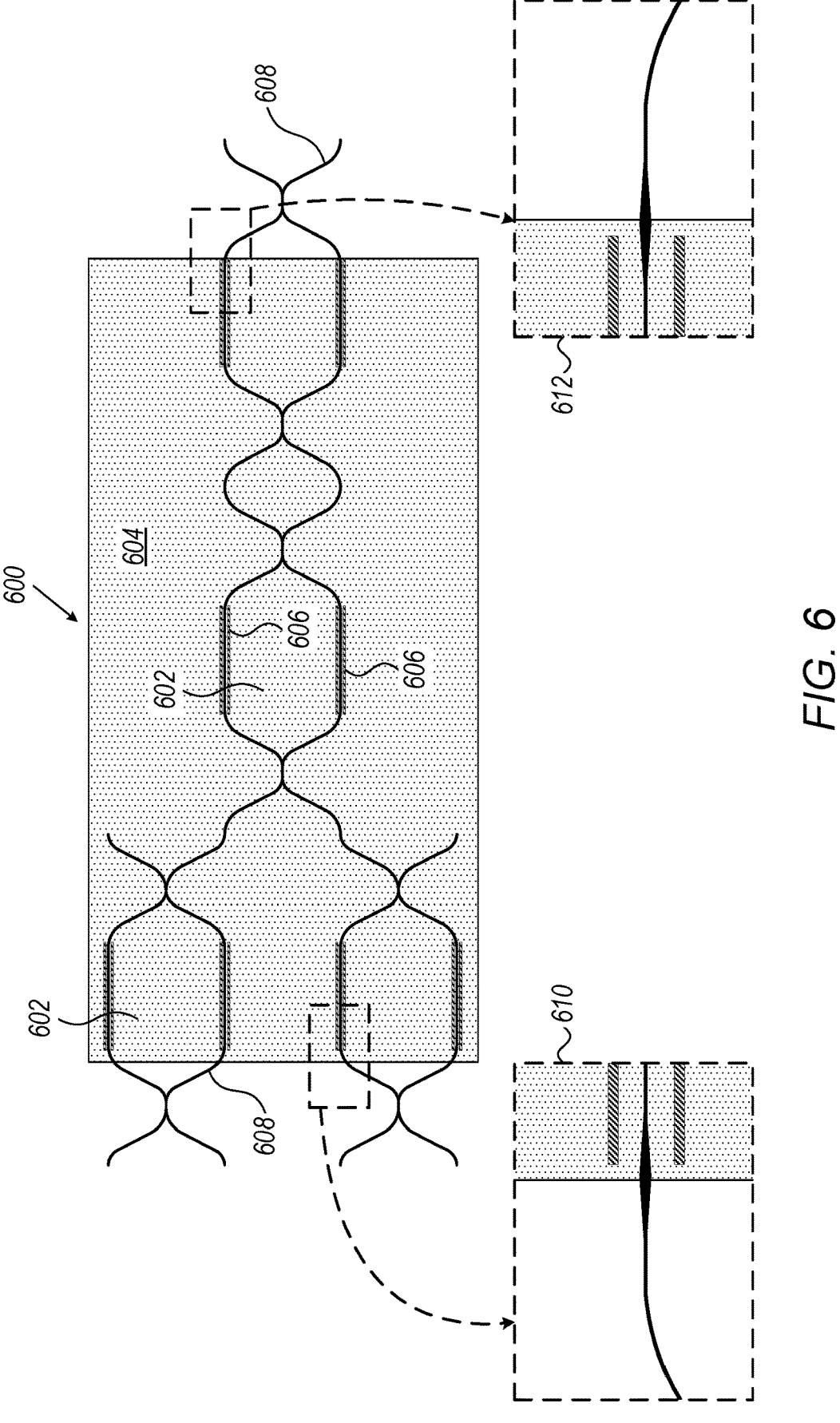
FIG. 6 is a schematic top view of a network of nested Mach-Zehnder interferometers, in accordance with an embodiment of the invention.

FIG. 6 is a schematic top view of a network 600 of nested Mach-Zehnder interferometers 602, in accordance with an embodiment of the invention. For the sake of simplicity, a controller, similar to controller 528 (FIG. 5), driving the phase modulators has been omitted from the figure. The controller applies voltages between the electrodes of at least some of interferometers 602 so as to switch guided optical waves through network 600.

Interferometers 602 in network 600 are similar to or identical with interferometer 500 (FIG. 5), and are coupled to each other through their exits and entrances. A contiguous BTO membrane 604 covers network 600, and each arm of each interferometer 602 has its own electrode pair 606, thus forming a phase modulator for each arm (similarly to phase modulators 512 and 514 in FIG. 5). Due to the lateral separation between adjacent interferometers 602, typically by a hundred microns or more, the crosstalk among the phase modulators of these interferometers is negligible.

Waveguides 608, similar to waveguides 502 in FIG. 5, are coupled into and out of network 600 using tapered couplers, as shown in FIG. 4. Tapered input and output couplers are shown in respective insets 610 and 612. Because the same contiguous BTO membrane 604 covers all the interferometers 602 in network 600, the tapered input and output couplers are needed only at the entrance to and exit from the network, rather than at the entrance to and exit from each interferometer as in the preceding embodiments. Thus, the use of the contiguous BTO membrane substantially reduces losses at the transitions between the elements of network 600.

FIG. 6 shows only four interferometers 602 for the sake of simplicity of the illustration. In alternative embodiments, a larger (or smaller) number of interferometers 602 may be used. The losses of a Mach-Zehnder interferometer 602 at the edge of network 600, with tapered transitions either at its input or its output is estimated to be 0.1782 dB, while the losses for an interferometer that is inside network 600 (without tapered transitions) is estimated to be 0.1272 dB.

Thus, a network of ten Mach-Zehnder interferometers, for example, having one input interferometer and one output interferometer, will be approximately 1.374 dB. By similar calculations, a network of twenty interferometers will have a total loss of about 2.646 dB, and a network of thirty interferometers will have a total loss of about 3.918 dB. By comparison, in the absence of the sort of tapered transitions described above, similar networks of ten, twenty, and thirty Mach-Zehnder interferometers will suffer total losses of 7.62 dB, 15.24 dB, and 22.86 dB, respectively.

In addition to the benefits of reducing loss, the use of a contiguous BTO membrane, such as membrane 604, has the advantages of reducing the chip area of the network, and simplifying the etch patterning of the BTO, thus reducing the processing costs.

Alternative Embodiments

In alternative embodiments, a network of Mach-Zehnder interferometers, such as network 600, may be manufactured on a SiN-only platform, which uses fused silica wafers or silicon wafers with an oxide layer grown on the silicon, rather than SOI. In such a case, some of the beneficial features of SOI, such as built-in detection, may be lost. However, the BTO membrane could be grown at a higher temperature (not limited by the constraints of the back-end of the line (BEOL) process) and could thus have improved optical properties. Additionally, processing the BTO membrane in the front-end of the line (FEOL) enables the use of a better lithographic process.

Although certain specific dimensions are called out in the embodiments described above, these dimensions are presented solely to illustrate certain principles of the present invention. Alternative dimensions implementing these principles will be apparent to those skilled in the art after reading the present disclosure and are considered to be within the scope of the present invention. It will thus be appreciated that the embodiments described above are cited by way of example, and that the present invention is not limited to what has been particularly shown and described hereinabove.

Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optoelectronic device, comprising:
a substrate;
an optical waveguide disposed on the substrate;
a dielectric layer disposed over the optical waveguide on the substrate;
a membrane comprising an electro-optical material disposed over the dielectric layer and overlying at least a part of the optical waveguide; and
electrodes configured to apply an electric field to the electro-optical material in a vicinity of the optical waveguide, thereby modulating a phase of a guided optical wave propagating in the waveguide,
wherein the waveguide has a first effective refractive index, and the membrane has a second effective refractive index, and the optical waveguide, the dielectric layer, and the membrane have dimensions chosen so that the first effective refractive index is greater than the second effective refractive index at a wavelength of the guided optical wave to minimize coupling between guided modes of the membrane and the optical waveguide.

2. The device according to claim 1, and comprising a controller coupled to apply a voltage between the electrodes so as to generate the electric field.

3. The device according to claim 1, wherein the optical waveguide comprises an optical material having a first intrinsic refractive index, while the electro-optical material has a second intrinsic refractive index that is greater than the first refractive index.

4. The device according to claim 3, wherein the guided optical wave has a wavelength in a visible range of the spectrum.

5. The device according to claim 1, wherein the electro-optical material comprises barium titanate (BTO).

6. The device according to claim 5, wherein the waveguide comprises silicon nitride (SiN), and the dielectric material comprises silicon dioxide ($SiO_2$).

7. The device according to claim 6, wherein the substrate is selected from a set of substrate materials consisting of silicon and fused silica.

8. The device according to claim 1, wherein the dielectric layer has a thickness between 50 nm and 500 nm.

9. The device according to claim 1, wherein the membrane overlies a first part of the optical waveguide but does not overlie a second part of the optical waveguide, and wherein the optical waveguide comprises a coupler comprising a pair of opposing tapers, which meet at a boundary of the membrane between the first and second parts.

10. An optoelectronic device, comprising:
a substrate;
a Mach-Zehnder interferometer disposed on the substrate and comprising:
first and second optical waveguides;
a splitter coupled to receive an input guided optical wave and split the guided optical wave into respective first and second guided optical waves propagating into the first and second optical waveguides; and
a combiner coupled to receive the first and second guided optical waves exiting from the first and second optical waveguides so that the first and second guided optical waves interfere to form an output guided optical wave;

a dielectric layer disposed over the first and second optical waveguides on the substrate;

a membrane comprising an electro-optical material disposed over the dielectric layer and overlying at least one of the first and second optical waveguides; and electrodes configured to apply an electric field to the electro-optical material in a vicinity of the at least one of the first and second optical waveguides, thereby modulating an intensity of the output guided optical wave by altering a phase difference between the first and second guided optical waves, wherein the first and second optical waveguides have a first effective refractive index, and the membrane has a second effective refractive index, and the first and second optical waveguides, the dielectric layer, and the membrane have dimensions chosen so that the first effective refractive index is greater than the second effective refractive index at a wavelength of the guided optical wave to minimize coupling between guided modes of the membrane and the optical waveguide.

11. The device according to claim 10, and comprising a controller coupled to apply a voltage between the electrodes so as to generate the electric field.

12. The device according to claim 10, wherein the membrane overlies both of the first and second optical waveguides.

13. The device according to claim 12, wherein the electrodes comprise a first pair of the electrodes in proximity to the first optical waveguide and a second pair of the electrodes in proximity to the second optical waveguide.

14. The device according to claim 10, wherein the first and second optical waveguides comprise an optical material having a first intrinsic refractive index, while the electro-optical material has a second intrinsic refractive index that is greater than the first refractive index.

15. The device according to claim 14, wherein the guided optical wave has a wavelength in a visible range of the spectrum.

16. The device according to claim 10, wherein the electro-optical material comprises barium titanate (BTO).

17. The device according to claim 16, wherein the first and second waveguides comprise silicon nitride (SiN), and the dielectric material comprises silicon dioxide ($SiO_2$).

18. The device according to claim 17, wherein the substrate is selected from a set of substrate materials consisting of silicon and fused silica.

19. The device according to claim 10, wherein the dielectric layer has a thickness between 50 nm and 500 nm.

20. The device according to claim 10, wherein the membrane overlies a first part of the at least one of the first and second optical waveguides but does not overlie a second part of the at least one of the first and second optical waveguides, and wherein the optical waveguide comprises at least one coupler comprising a pair of opposing tapers, which meet at a boundary of the membrane between the first and second parts.

21. Optoelectronic apparatus, comprising:

a substrate;

a network of interconnected Mach-Zehnder interferometers disposed on the substrate, each Mach-Zehnder interferometer comprising:

first and second optical waveguides;

a splitter coupled to receive an input guided optical wave and split the guided optical wave into respective first and second guided optical waves propagating into the first and second optical waveguides; and a combiner coupled to receive the first and second guided optical waves exiting from the first and second optical waveguides so that the first and second guided optical waves interfere to form an output guided optical wave;

a dielectric layer disposed over the multiple interconnected Mach-Zehnder interferometers on the substrate;

a membrane comprising a contiguous layer of an electro-optical material disposed over the dielectric layer and overlying at least a part of the network of interconnected Mach-Zehnder interferometers;

electrodes configured to apply an electric field to the electro-optical material in a vicinity of at least one of the first and second optical waveguides in each of at least some of the Mach-Zehnder interferometers; and a controller coupled to apply voltages between the electrodes so as to switch guided optical waves through the network, wherein the first and second optical waveguides have a first effective refractive index, and the membrane has a second effective refractive index, and the first and second optical waveguides, the dielectric layer, and the membrane have dimensions chosen so that the first effective refractive index is greater than the second effective refractive index at a wavelength of the guided optical wave to minimize coupling between guided modes of the membrane and the optical waveguide.

22. The apparatus according to claim 21, wherein the membrane overlies a first part of the network but does not overlie a second part of the network, and wherein at least one of the optical waveguides comprises a coupler comprising a pair of opposing tapers, which meet at a boundary of the membrane, between the first and second parts.

23. The apparatus according to claim 22, wherein at least some of the Mach-Zehnder interferometers are contained entirely below the membrane and do not comprise the opposing tapers.

24. The device according to claim 21, wherein the first and second optical waveguides comprise an optical material having a first intrinsic refractive index, while the electro-optical material has a second intrinsic refractive index that is greater than the first refractive index.

25. The device according to claim 24, wherein the guided optical wave has a wavelength in a visible range of the spectrum.

26. The device according to claim 21, wherein the electro-optical material comprises barium titanate (BTO).

27. The device according to claim 26, wherein the first and second waveguides comprise silicon nitride (SiN), and the dielectric material comprises silicon dioxide ($SiO_2$).

28. The device according to claim 27, wherein the substrate is selected from a set of substrate materials consisting of silicon and fused silica.

29. The device according to claim 21, wherein the dielectric layer has a thickness between 50 nm and 500 nm.

* * * * *